W. G. MILLER.
DRIVING WHEEL FOR MOTOR VEHICLES.
APPLICATION FILED JULY 20, 1912.
1,082,434.
Patented Dec. 23, 1913.
2 SHEETS—SHEET 1.
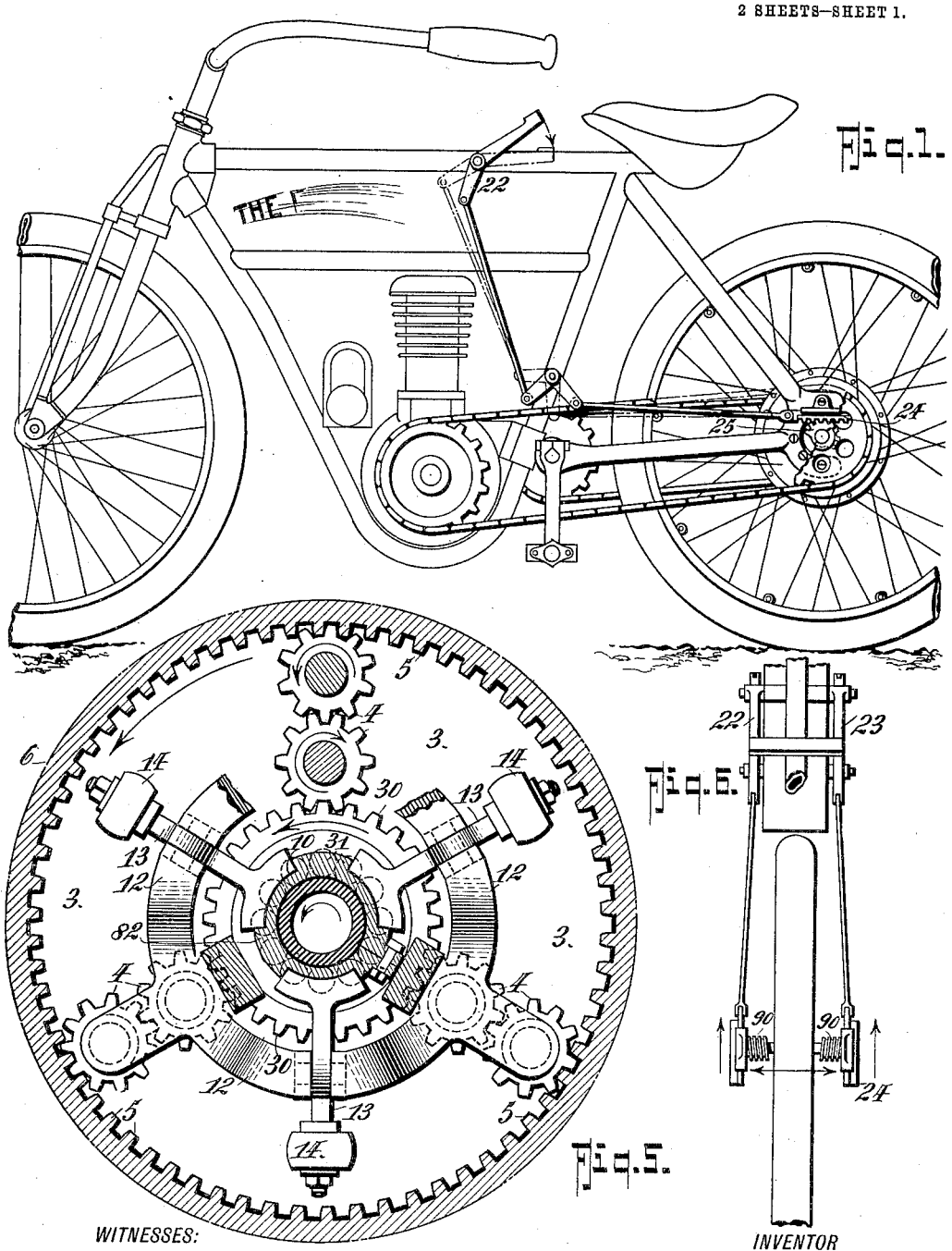

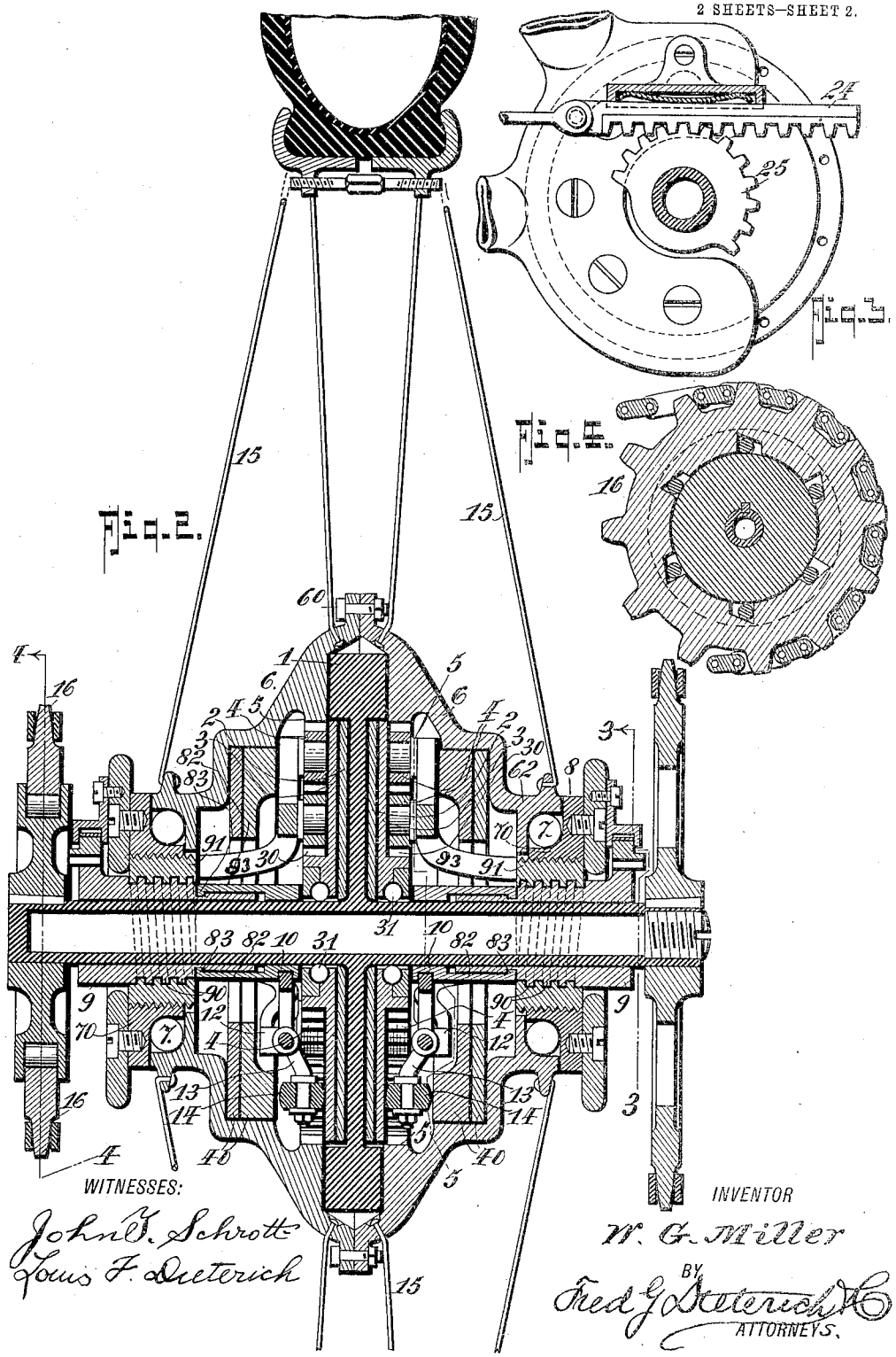

UNITED STATES PATENT OFFICE.

WILLIAM GEORGE MILLER, OF NORTH TARRYTOWN, NEW YORK.

DRIVING-WHEEL FOR MOTOR-VEHICLES.

1,082,434. Specification of Letters Patent. Patented Dec. 23, 1913.

Application filed July 20, 1912. Serial No. 710,576.

*To all whom it may concern:*

Be it known that I, WILLIAM G. MILLER, residing at North Tarrytown, in the county of Westchester and State of New York, have invented a new and Improved Driving-Wheel for Motor-Vehicles, of which the following is a specification.

This invention relates generally, to improvements in motor cycle drive mechanisms, and more specifically has for its object to provide an improved construction of driving wheel for motor driven vehicles, in whose structure is included the transmission mechanism and means for readily throwing the said mechanism into and out of operative connection.

My invention comprehends, generally, a driving axle having a fly member or disk, a wheel loosely mounted on the axle, transmission mechanism that forms a coöperative part of the wheel and means for clutching the said transmission mechanism with the fly member or disk, the several stated parts being especially designed whereby to provide for a high speed movement of the wheel under a minimum friction and motor power.

My invention also consists in the provision of a driving wheel for motor vehicles in which is included a hollow two-part driving hub, transmission mechanism incased within the hub and in such a manner that the parts may be readily assembled, accessible in case of repairs, and held dust proof.

With other objects in view that will be hereinafter referred to, my invention also embodies certain details of construction and peculiar combination of parts all of which will be first explained, specifically pointed out in the appended claims and illustrated in the accompanying drawings, in which, Figure 1, is a side elevation of so much of a motor cycle, as is necessary to illustrate the practical application of my invention. Fig. 2, is a cross section of a portion of my improved wheel and transmission mechanism, the latter being shown in the inoperative or resting position. Fig. 3, is a transverse section taken on the line 3—3 on Fig. 2, and illustrates a portion of the clutch controlling mechanism hereinafter referred to. Fig. 4, is a cross section on the line 4—4 of Fig. 2 of one of the chain driven sprocket gears. Fig. 5, is a transverse section taken substantially on the line 5—5 on Fig. 2 and illustrates the transmission mechanism in elevation. Fig. 6, is a diagrammatic plan view of the lever connections with the control device for the transmission clutches.

While I have shown my invention as especially designed for motor cycle uses, I desire it understood the same with immaterial modifications of the details of constructions, may be readily adapted for use on any of the ordinary types of motor vehicles.

In the practical arrangement and the preferred form, my invention comprises a driven shaft or axle which has a centrally disposed integral disk or fly member 1.

9—9 designate clutch sleeves, one of which is mounted on each end of the shaft, and each of which has an external thread or worm 90, the opposite sleeves having relatively right and left threads. 91—91 designate clutch collars, one of which is fixedly attached to each of the frame members 93, and the said members have right and left threads for engaging the threads 90 on the clutch sleeves 9, as is clearly shown in Fig. 2 of the drawing.

In my construction of wheel, the hub is formed of two sections 6—6, each having an apertured annular flange for receiving the connecting bolts 60, the point of connection of the said two sections being on a working line taken midway through the fly member or disk 1.

Each hub section, one of which is at each side of the fly member 1, has an internal working gear 5, and the outer or bearing end of each hub section has an annular rim or collar 62 for riding on the bearing balls 7, held in the ball race 70 on the clutch collar 8 fixedly attached to the frame portions, as shown in Fig. 2.

15 designate the wheel spokes and these are in the nature of double spokes, one set for each divided hub section, the inner end of one spoke of each set joining with the outer or bearing end of the hub, the like end of the other spoke of the set connecting to the hub near its inner flanged end, while the outer end of both spokes of the set connect with the corresponding sides of the tire rim, which may be of any approved type and arranged to carry a single or duplex tire.

2 and 3 indicate friction disks, one set for each side of the shaft disk 1. Each disk has a driving gear 30 that meshes with a plurality of sets of transmission gears 4 that coact with the internal gears 5 of the hub sections 6—6, the relation of the several gears being such that motion is transmitted to the hub and wheel in the direction of the movement of the motor driven shaft or axle. The disks 3 carrying the gears 30 have ball races 31 for receiving the bearing balls that engage the main axle or shaft, and which are held in place by cap rings, as shown.

A series of clutch levers 13 are pivotally mounted on the ring-like bearing frames 12 that extend inwardly from and are integral with the threaded collars 91, made fast to the side frame members, as is best shown in Fig. 2. Each lever 13 is in the nature of a crank lever and at one end it carries a bearing roller 14 for pressing against the disks 3, and brake disks 40.

The inner end of each lever 13 engages a groove 10 in a sleeve 82 that has a flange 83 that couples with an annular groove in the clutch sleeves 9 slidable on the shaft or axle.

By reason of the manner in which the clutch levers are mounted and the connections that join the said levers with the clutch sleeves 9, it follows that as the said sleeves are moved outwardly on the shaft or axle, the bearing rollers of the levers will be moved inwardly against the disks 3 to force them, and the intermediate friction disks 2, into a locked engagement with the shaft disk 1, thereby clutching the shaft and the disks 3, carrying the driving gears 30, to move together and in consequence, through the transmission gears, rotate the wheel with the shaft, it being obvious that as the clutch hubs are moved inwardly on the shaft, the friction disks will be released and the hub and wheel will then be neutral and run free with respect to the shaft.

16 designates the sprocket or chain gears on the shaft having the usual clutch devices for being gripped with the shaft when the motor is running forward. It is understood that the clutch mechanisms for the opposite sides of the central disk or fly member are operated in unison and for such purpose any setting mechanism operable by the rider on the cycle is utilized. In the drawings I have shown one way for controlling the clutch mechanism and the same consists of a set of connected crank levers 22—23, a rack bar 24 and a toothed segment 25 the latter being an integral part of the clutch sleeve 9. In the arrangement shown, when the lever 22 is pushed down and held there by any suitable means (not shown) the rack bars 24 will turn their respective clutch sleeves, and in consequence put the clutch members 13 to their operating position, see Fig. 2, and thereby couple up the wheel hub with the shaft, a shifting of the lever 22 to the other position serving to move the rack bars 24 in the other direction to turn the clutch sleeves 9 back and in consequence release the clutch lever 10. It may further be made clear that the purpose of disks 40 is to act as brakes when the rollers 14 are brought into frictional engagement therewith, such action taking place where it is desired to bring the vehicle to rest.

By reason of forming the spokes in sets and lacing them, as shown, the several wheel parts constitute, as it were, two cycle wheels joined together by a divided hub and rim. This not alone provides for an easy assemblage of the mechanism within the hub, but also gives the required strength to the wheel.

While the arrangement of the parts as described and shown disclose a preferred arrangement of my invention, the details thereof may be varied and modified to suit different requirements without departing from my invention or the scope of the appended claims.

From the foregoing taken in connection with the accompanying drawings, the complete construction, the manner in which my invention operates and its advantages will be readily apparent to those skilled in the art to which the invention relates.

What I claim is:

1. In a driving means of the character described; a driving axle having a friction disk, and a driven gear, a wheel loosely mounted on the axle, a transmission mechanism that coöperates with the wheel, means for clutching the said transmission mechanism with the friction disk, the said means including a shiftable member carrying a driving gear and intermediate members connecting the said driving gear with the driven gear on the wheel.

2. A driving wheel of the character described, including a driving axle, a two-part hub loosely mounted thereon and having an internal driven gear, the said axle having a centrally disposed friction member, a contacting disk slidable upon the axle for coöperating with the said centrally disposed friction disk, said contacting member carrying a driving gear, a clutch mechanism for moving the said contacting member into operative engagement with the axle disk, said mechanism being mounted within the hub, and an actuating lever external to the hub for controlling the said clutch mechanism.

3. In a driving wheel of the character described; a driving axle, a wheel loosely mounted upon the axle, the said axle having a centrally disposed disk, the said wheel including a single rim, a two-part hub, and independent sets of spokes that connect each hub section with its respective portion of the wheel rim, a pair of oppositely disposed friction members slidable upon the axle, each of the said slidable disks having a driving gear, each of the hub sections having an internal annular gear, stationarily held intermediate gears that connect the gears on the slidable friction member with the annular gears of their respective hub sections, clutch mechanisms held within the hub for shifting the gear equipped disks into contact with the centrally disposed disk upon the axle, and means including lever controlled devices external to the wheel for actuating the clutch mechanism to shift the slidable members into frictional engagement with the centrally disposed disk on the axle.

4. In a driving wheel of the character described, a driving axle having a centrally disposed friction disk, (a wheel body loosely mounted thereon, consisting of a two-part hub, a rim, and separate sets of spokes connecting each hub section with its respective rim portion, transmission mechanism mounted within the hub, said transmission mechanism including a shiftable member for each hub section, said members being arranged to engage the opposite sides of the axle disk, and means for shifting the said sliding members into and holding them in frictional engagement with the axle disk, said means including actuating devices operable externally of the wheel.

5. In a driving wheel of the character described; a driving axle, the said axle having a centrally disposed friction disk projected at right angles thereto, frame bearings at the opposite ends of the axle, a two-part hub rotatably mounted on the frame bearings, each of the hub parts having an internal annular gear, clutching devices for engaging the opposite sides of the axle disk, each of the clutch devices having an axially disposed driving gear, intermediate gears supported by the frame bearings within the hub members for connecting the clutch driving gears with the annular gears of their respective hub portions for shifting the said clutch devices into and out of operative connection with the axle disk, and means operable within the hub and including operating lever devices extending externally of the hub for shifting and holding the clutch mechanism to move the clutch driving gear for shifting the clutch mechanism into an operative engagement with the axle disk.

6. In a driving wheel of the character described; a driving axle, a centrally disposed friction disk fixedly held on the axle and projected at right angles thereto, frame bearings at the opposite ends of the axle, a two-part hub rotatably mounted on the frame bearings, each of the hub parts having an internal annular gear, clutching devices for engaging the opposite sides of the axle disk, each of the clutch devices having an axially disposed driving gear, intermediate gears supported by the frame bearings within the hub members for connecting the clutch driving gears with the annular gears of their respective hub portions, means operable within the hub and including operating lever devices extending externally of the hub for shifting and holding the clutch mechanism to move the clutch driving gear for shifting the clutch mechanism into an operative engagement with the axle disk; said means including bell crank members carrying roller bearings stationarily held within the wheel hub portion and engaging the gear carrying disks for pressing the gear carrying disks into operative engagement with the axle disk.

7. In a driving wheel of the character described; a driving axle, the said axle having a centrally disposed friction disk projected at right angles thereto, frame bearings at the opposite ends of the axle, a two-part hub rotatably mounted on the frame bearings, each of the hub parts having an internal annular gear clutch device for engaging the opposite sides of the axle disk, each of the clutch devices having an axially disposed driving gear, intermediate gears supported by the frame bearings within the hub members for connecting the clutch driving gears with the annular gears of their respective hub portions and means operable within the hub for shifting and holding the clutch devices in operative engagement with the axle disk, the said means including sliding clutch members, a rotatable thread connection for each of the sliding clutch members, each of the said rotatable thread connections including a segmental rim, a rack for each of the said segmental gear rims and operative lever devices connected with the said racks for operating them in unison.

8. A wheel body, a drive axle on which the said body is loosely mounted, a mechanism for transmitting the motion of the axle to the wheel, said mechanism including a frictional clutch device, operating means for the said device, and a brake device also operated by the said operating means and brought into action after the said clutch device is released.

9. A wheel body, a drive axle on which the said body is loosely mounted, a mechanism for transmitting the motion of the axle to the wheel, said mechanism including frictional clutch devices, operating means for the said devices, a brake device also operated by the said operating means and brought into action after the said clutch devices are released, said operating means including rocker arms having members for alternately engaging with the said clutch devices and the said brake device, and means for rocking the said arms.

WILLIAM GEORGE MILLER.

Witnesses:
CHARLES M. ADAMS,
PHINEAS MACNUTT.

Copies of this patent may be obtained for five cents each, by addressing the "Commissioner of Patents, Washington, D. C."